INVENTOR.
THEODORE T. LAW
BY Elliott & Pastoriza
ATTORNEYS

United States Patent Office 3,272,112
Patented Sept. 13, 1966

3,272,112
ANGEL FOOD CAKE TIN REMOVER
Theodore T. Law, 2711 Southwest Drive,
Los Angeles, Calif.
Filed June 1, 1964, Ser. No. 371,404
12 Claims. (Cl. 99—426)

This invention generally relates to an apparatus for loosening cakes from cake tins and more particularly concerns a novel apparatus for partially removing angel food cakes from conventional angel food cake tins.

Angel food cakes, unlike conventional cakes are formed by depositing the cake batter in a tin or pan which has a central open cone. When the cake is subsequently removed, the cake is formed with a central aperture. The usual method of removing such angel food cakes from the baking tin is with a knife or other similar thin instrument which is edged around the areas where the cake contacts the tin in an effort to loosen the cake therefrom. Although such a method of removing angel food cakes is practical and relatively convenient for home use and the like, it is a time-consuming method in instances when angel food cakes are produced on a mass production basis such as in bakeries and the like.

One object, therefore, of the present invention, is to provide an improved apparatus for partially removing angel food cakes from conventional angel food cake tins, the apparatus being constructed such that the cake may be loosened very quickly and effectively without the need of expensive and time-consuming manual labor.

Another object of the present invention is to provide an apparatus for loosening angel food cakes from angel food cake tins or pans wherein the apparatus is relatively simply constructed with a minimum number of parts, and in which the apparatus is sufficiently rugged to withstand repeated usage without any appreciable maintenance.

Still a further object of the present invention is to provide an apparatus in which the wearing parts may, if necessary, be replaced very quickly without the necessity of expensive shutdown time or the like.

Still another object of the present invention is to provide an apparatus for removing angel food cakes from angel food cake tins, which apparatus is adaptable to incorporation in mass production operations.

These and other objects and advantages of the present invention are generally achieved by providing an apparatus for partially removing or loosening angel food cakes from conventional angel food cake tins, the apparatus comprising a frame member which has mounted therein movable head means. The movable head means carries a first plurality of fingers extending downwardly therefrom in a circumferential or cylindrical arrangement. Such plurality of fingers is designed to engage the inner sides of the outer sidewalls of the angel food cake tin and loosen the cake contacting the same. A second plurality of fingers is carried by the movable head means and is designed to engage the outer sides of the inner cone characterizing the conventional angel food cake tin. These latter fingers thus loosen the cake from the cone section of the cake pan.

In addition, in a preferred embodiment, it is desirable to also include a pilot member which is coupled to the movable head means and which tends to index the angel food cake tin into a proper position such that the fingers loosening the cake from the, respective, sidewalls will be properly positioned to effect this operation.

A better understanding of the improved angel food cake tin loosening apparatus will be had by reference to the drawings, showing merely an illustrative embodiment, and in which.

Figure 1:
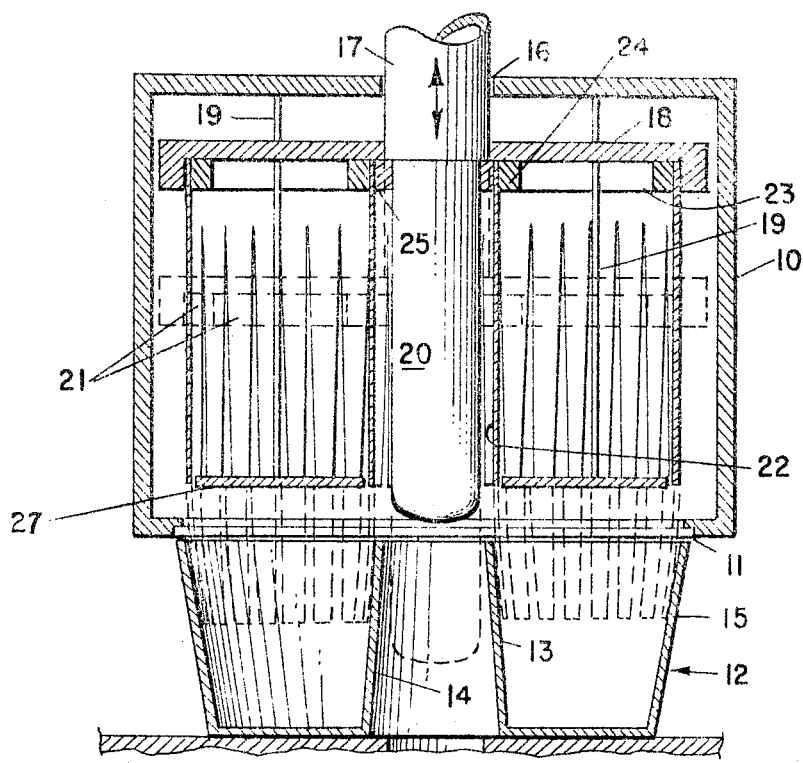
FIGURE 1 is a sectional view of the angel food cake tin removing apparatus with parts thereof being shown in schematic form for clarity of illustration.

Referring now to the drawings, there is shown in FIGURE 1 frame 10 provided with a lower flange 11 spaced slightly above the conventional angel food cake tin or pan 12. The angel food cake tin 12 is provided with a central cone 13 having an opening 14 therein, and is also characterized by the usual outer sidewalls 15 circumferentially spaced from and around the cone 13.

The frame 10 is provided with an opening 16 to accommodate a means 17 for raising and lowering a circular movable head means 18. The means 17 may comprise an air piston, liquid piston, mechanical linkage, or any equivalent power source designed to impart vertical movement to the movable head means 18 as indicated by the arrows. The head means 18 is designed to be rigidly coupled to the means 17 so that the head means will move up and down therewith. Preferably the movable head means 18 is guided in its upward and downward movement by guide rods 19 extending at right angles from the frame 10.

The head means 18 also carries a pilot member 20 which extends axially downwardly therefrom. The pilot member 20 is designed to index and properly position the cake tin 12 for the cake loosening operation. Of course, the tin 12 is presumably substantially in its correct position before the pilot member 20, as hereafter described, is lowered to its operating position; however, the pilot member 20 assures the proper disposition of the cake tin 12. In this regard, it will be noted that the cake tin 12 is positioned on a flat surface which may be provided with an aperture, as shown, to accommodate the lower end of the pilot 20 as it moves downwardly.

Figures 2, 3, 4:
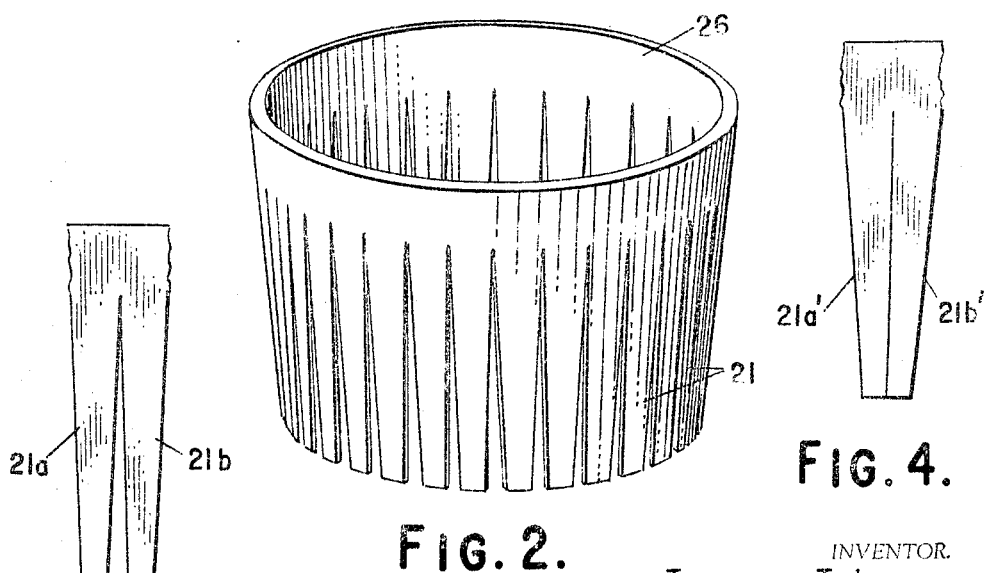
FIGURE 2 is a perspective view of one plurality of fingers employed in conjunction with the apparatus of FIGURE 1, such fingers being shown in a partially lowered position.
FIGURE 3 illustrates a portion of the fingers in FIGURE 2 in the form shown therein; and, FIGURE 4 illustrates the fingers of FIGURE 3 in a closed position or after they have been urged into the cake tin.

Also extending from the movable head means 18 and coupled thereto are a first plurality of outer circumferential disposed fingers 21 which are preferably formed from stainless steel and from an integral sheet thereof, as shown in FIGURE 2. The fingers 21 preferably extend downwardly in a cylindrical configuration with tapered openings therebetween for engaging the inner sides of sidewalls 15. Another similar set of inner fingers 22 are carried by the head means 18 and are designed to co-function with the other sides of the inner cone 13 of the tin 12. The fingers 21 are retained in position by the head means 18 and a cooperating locking ring 23; similarly, the inner fingers 22 are retained in position by cooperating locking rings 24 and 25. These locking rings may be provided with a force fit, as indicated, or may be sprung into place, or locked in place by radially extending screws or the like (not shown). The locking rings merely serve the function of retaining the cylindrical configuration of fingers in proper disposition and in secured relationship to the movable head means 18.

The operation of the improved apparatus for loosening angel food cakes from angel food cake tins may now be described. As stated, the tin 12 would normally be disposed upon some flat table or the like and properly positioned such that its cone section would be approximately underneath the pilot member 20. Thereafter, the means 17 would be operated to lower the head means 18 and the coupled pilot member 20. As the pilot member 20 moves down towards the dotted line position indicated, it would first positively index and center the cake tin 12. Thereafter, the fingers 21 and the fingers 22 (preferably pre-moistened with water by auxiliary apparatus not shown) would come into engagement with the respective outer sidewalls 15 and inner cone 13 in the manner as indicated by the dotted line showings of these members. The fingers would gradually decrease the tapered openings therebetween from the configuration shown in FIGURE 3 wherein the fingers 21a and 21b define such opening to the position of FIGURE 4 wherein the fingers have come together. Thus, in the position indicated by fingers 21a' and 21b' in FIGURE 4, the fingers have reached the lowermost limit of their travel.

In order to guide the fingers 21 and 22 in their downward movement of travel, it is desirable to provide a stationary disc 27 (see FIGURE 1) which is attached to the lower ends of the guide rods 19 and thus fixed with respect to the frame 10. Thus, as the fingers 21 and 22 move downwardly, they are kept on a given circumference until they gradually are forced together and inwardly towards a smaller diameter as they move downwardly along the cone 13 and the sidewalls 15. Preferably, the fingers reach a distance approximately ⅛ of an inch from the bottom of the pan 12. Thereafter the means 17 is operated to raise the fingers; in the event the tin 12 tends to follow the fingers 21 and 22, the flange 11 of the frame 12 acts to prevent such movement.

In one form of construction, it is desirable that the pilot member 20 extend about ½ inch or so below the bottom of the fingers in order to properly position the tin 12 before the fingers engage same. Also, it will be noted in the drawings that the fingers are somewhat longer than the sidewalls 15 and the cone 13 in order to accommodate various sizes of cake tins. These dimensions as well as the spacing of the openings between the fingers and the shape thereof will vary, of course, according to the particular design considerations.

It will be appreciated that the table upon which the cake tin 12 is disposed may comprise a circular rotating table and be provided with a plurality of tins which are sequentially designed to move underneath the apparatus such that the pilot member 20 may move downwardly with the fingers 21 and 22 to index and thereafter loosen the angel food cake from the angle food cake tin. It will also be evident that the apparatus of the present invention with minor modifications may be used upside down from the position shown with suitable means being provided to retain the tin and hold the cake as it is removed.

Of course, it will be thus appreciated by those skilled in the art that the invention may be changed and refined in many respects without departing from the spirit and scope thereof as set forth in the following claims.

What is claimed is:

1. An apparatus for loosening angel food cakes from angel food cake tins which have outer sidewalls and an inner cone, said apparatus comprising, in combination: a frame; head means movably mounted within said frame; a pilot member axially extending from and carried by said head means and designed in an operating position to fit within said cone; a first plurality of resilient fingers carried by said head means and circumferentially spaced from and arranged about said pilot member, said first plurality of fingers being designed in an operating position to engage the inner sides of said outer sidewalls to thereby separate the cake therefrom; a second plurality of resilient fingers carried by said head means and circumferentially spaced from and arranged about said pilot member on a different diameter, said second plurality of fingers being designed in an operating position to engage the outer sides of said inner cone to thereby separate the cake therefrom; and, means for moving said head means to bring said pilot member and said first and second plurality of fingers to said, respective, operating positions.

2. An apparatus for loosening angel food cakes from angel food cake tins, according to claim 1, in which said pilot member extends a somewhat further distance from said head means than said fingers such that said pilot member may be employed to first index said cake tin with respect to said fingers before said fingers engage the latter.

3. An apparatus for loosening angel food cakes from angel food cake tins which have outer sidewalls and an inner cone, said apparatus comprising, in combination: a frame; head means movably mounted within said frame; a first plurality of resilient fingers carried by said head means and circumferentially spaced thereabout and designed in an operating position to engage the inner sides of said outer sidewalls to thereby separate the cake therefrom; a second plurality of resilient fingers carried by said head means and circumferentially spaced thereabout at a different radius and designed in an operating position to engage the outer sides of said inner cone to thereby separate the cake therefrom; and means for moving said head means to bring said first and second plurality of fingers into said, respective, operating positions.

4. The combination, according to claim 3, and gauge means carried by said movable head means for gauging the circumferential position of said first plurality and second plurality of fingers prior to movement of said fingers into said operating positions.

5. The combination according to claim 4 in which said gauge means comprises an annular disc carried by said frame.

6. An apparatus for loosening angel food cakes from angel food cake tins which have outer sidewalls and an inner cone, said apparatus comprising, in combination: a frame; head means movably mounted within said frame; a pilot member axially extending from and carried by said head means and designed in an operating position to fit within said cone; a first plurality of resilient fingers circumferentially spaced from and carried by said head means, and designed in an operating position to engage the inner sides of said outer sidewalls to thereby separate the cake therefrom; a second plurality of resilient fingers circumferentially spaced from and arranged about said pilot member, carried by said head means, and designed in an operating position to engage the outer sides of said inner cone and thereby separate the cake therefrom; means for moving said head means to bring said pilot member and said first and second plurality of fingers into said respective, operating positions; and, guide rods for guiding the downward movement of said head means.

7. An apparatus for loosening angel food cakes from angel food cake tins, according to claim 6, in which an annular disc is supported from the lower end of said guide rods, said annular disc acting to gauge the diameter of the lower ends of said fingers prior to their movement into the operating position.

8. An apparatus for loosening angel food cakes from angel food cake tins, according to claim 6, and a flange provided on said frame and designed to engage said cake tin in the event said cake tin tends to rise with said fingers as they are moved away from their operating position.

9. An apparatus for loosening angel food cakes from angel food cake tins, according to claim 6, and locking rings co-functioning with said head means to retain said fingers therein.

10. An apparatus for loosening angel food cakes from angel food cake tins which have outer sidewalls and an inner cone, said apparatus comprising, in combination: a frame; head means movably mounted within said frame; a first plurality of resilient fingers circumferentially spaced from and carried by said head means, said fingers being arranged in a cylindrical form but having tapered openings therebetween increasing in width to the free ends thereof and designed in an operating position to engage the inner sides of said outer sidewalls to thereby separate the cake therefrom; a second plurality of resilient fingers circumferentially spaced from and carried by said head means, said fingers being arranged in cylindrical form and having tapered openings therebetween increasing in width towards the free ends thereof, said fingers being designed in an operating position to engage the outer sides of said inner cone; and, means for moving said head means to bring said fingers into said, respective, operating positions.

11. An apparatus, according to claim 10, and a pilot member axially extending from and carried by said head means and designed in an operating position to fit within said cone.

12. An apparatus, according to claim 10, and an annular disc carried by said head means for gauging the circumferential position of said fingers prior to entry into said cake tin.

References Cited by the Examiner
UNITED STATES PATENTS 1,464,792    8/1923    Wierth             249—77

WALTER A. SCHEEL, *Primary Examiner.*